M. SUBERT.
EGG RECEPTACLE.
APPLICATION FILED JULY 26, 1910.
1,009,451.
Patented Nov. 21, 1911.
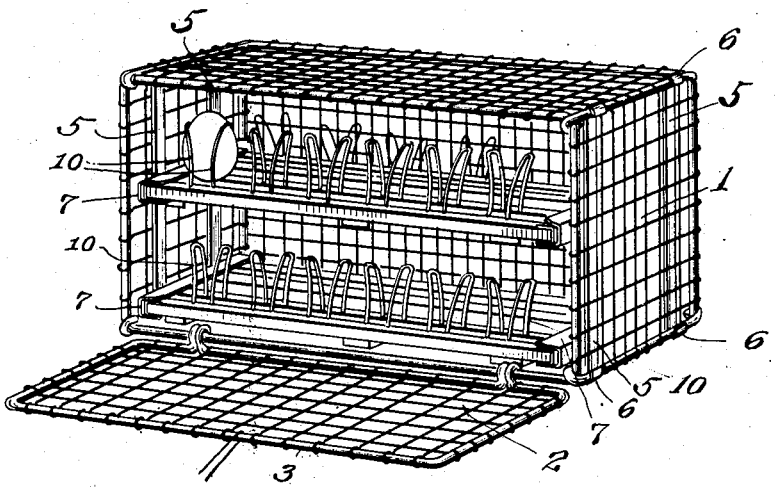
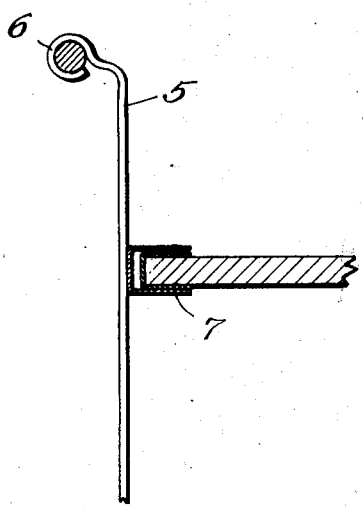
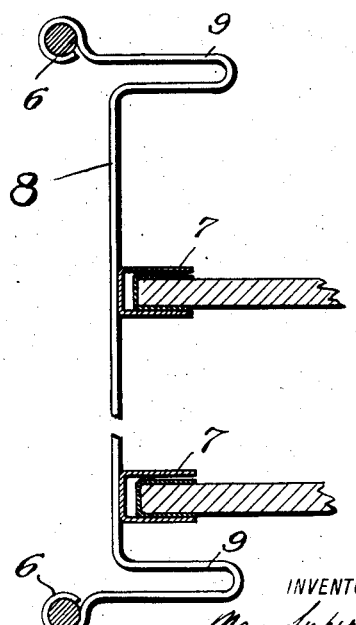
WITNESSES
INVENTOR
BY
ATTORNEYS.

UNITED STATES PATENT OFFICE.

MAX SUBERT, OF NEW YORK, N. Y.

EGG-RECEPTACLE.

1,009,451.  Specification of Letters Patent.  Patented Nov. 21, 1911.

Application filed July 26, 1910. Serial No. 573,945.

*To all whom it may concern:*

Be it known that I, MAX SUBERT, a citizen of the United States of America, residing at New York city, in the county and State of New York, have invented certain new and useful Improvements in Egg-Receptacles, of which the following is a specification.

My invention relates to portable receptacles for eggs and the like.

An object of the invention is a device of this character so constructed that the eggs cannot be broken by rough handling of the receptacle; and to this end, the trays or supports for the eggs are mounted in a peculiar manner upon springs or similar resilient means within the receptacle so as to be relieved of any shock to which the receptacle may be subjected. These springs in one form of the invention permit of slight lateral movement of the trays, and in another form of the invention permit also of slight up and down movement of the trays within the receptacle.

Another object of the invention is a construction of the springs and trays whereby the latter may be readily removed or placed in position, or interchanged at will, without any manipulation of the springs or supports within the receptacle. The receptacle is also of such construction that free access of air to eggs is had, so that the eggs may be kept in good condition a maximum length of time.

These and other objects of the invention will presently and more at large appear in connection with the accompanying drawings in which—

Figure 1 is a perspective view of the assembled apparatus. Fig. 2 is a detail view of one form of the spring support for the trays, and Fig. 3 is a detail view of a modified form of the spring support for the trays.

Referring to Fig. 1, the receptacle 1 is shown in the form of a woven wire box or cage provided with frame bars 6, and having a door 3 pivoted to its lower front, and provided with suitable locking device such as for instance a wire engaging the frame of the door and cage and having its ends secured by a lead or other seal. Within the receptacle on both ends thereof, as shown in Fig. 1, are spring supports 5. The form of support shown in Fig. 1 is the form shown in detail in Fig. 2; and is in effect a leaf spring formed of a flat body having its ends bent around and secured to spaced apart frame bars 6, the body of each support being bent adjacent said ends to impart resiliency thereto. The body of each support 5 is approximately straight between said bent portions. At different heights on the springs 5 are U-shaped pieces or guides 7, extending across the ends of the receptacle within the same, and adapted to receive the trays. The supports 5 are secured at their ends to the receptacle, and are free to have slight resilient movement to and from the end walls of the receptacle. The trays being carried by the springs move therewith, so that when the receptacle is knocked against any other object, the shock is absorbed by the springs and is not transmitted to the trays or to the eggs supported thereon.

In Fig. 3, the spring supports 8 are shown of slightly different construction than in Fig. 2. The springs 8 are bent to form elongated convolutions as at 9, near their upper and lower ends within the receptacle, so that the portion of the spring between the upper and lower bends 9 is free to have resilient movement up and down as well as to and from, the end walls of the receptacle.

The U-shaped pieces 7, as shown, are all alike, and the trays are also identical in construction so that they are interchangeable on the spring supports. The interchangeability of the trays is of importance both as a matter of convenience in inserting the same into the receptacle and as a means for permitting the trays to be positioned so as to classify or identify the particular product carried by each tray. The eggs are held on the trays, preferably by wire prongs 10, and the whole construction is such that access of air to all of the eggs and to all exterior parts of the same is had.

It is obvious that the apparatus shown may be varied in certain of its details within the scope of the invention.

What I claim is:

1. A receptacle of the character described comprising a frame, supporting members having their ends secured to said frame, said supporting members being bent adjacent said ends to impart resiliency thereto, said supporting members being approximately straight between said bent portions, and tray supporting means carried by said supporting members.

2. A receptacle of the character described comprising a body provided with frame bars, supporting members having their ends bent around spaced apart frame bars to secure the same in position, said supporting members being bent adjacent said ends to impart resiliency thereto, said supporting members being approximately straight between said bent portions, and tray supporting means carried by said supporting members.

3. A receptacle of the character described comprising a frame, supporting members having their ends secured to said frame, said supporting members being bent adjacent said ends to form elongated convolutions, whereby resiliency is imparted to said supporting members, the latter being approximately straight between said bent portions, and tray supporting means carried by said supporting members.

4. A receptacle of the character described comprising a body provided with frame bars, supporting members having their ends bent around spaced apart frame bars to secure the same in position, said supporting members being bent adjacent said ends to form elongated convolutions, whereby resiliency is imparted thereto, said supporting members being approximately straight between said bent portions, and tray supporting means carried by said supporting members.

Signed by me at New York city, county and State of New York, this 22nd day of July, 1910.

MAX SUBERT.

Witnesses:
EMMA W. RENNÉ,
RALPH O. L. FAY.